United States Patent
Izhelya et al.

[11] 3,772,539
[45] Nov. 13, 1973

[54] LINEAR INDUCTION ELECTRIC MOTOR

[76] Inventors: Georgy Ignatievich Izhelya, Bulvar Lesi Ukrainki 24; Alexandr Grigorievich Shapovalenko, Ulitsa Zatonskogo 15/14; Vasily Ivanovich Shevchenko, Ulitsa Vernadskogo 75; Vladimir Sergeevich Popkov, Ulitsa Dorogozhitskaya 21, all of Kiev, U.S.S.R.

[22] Filed: Feb. 16, 1972

[21] Appl. No.: 226,922

[52] U.S. Cl. ................................. 310/13
[51] Int. Cl. ............................... H02k 41/02
[58] Field of Search ................. 310/12–14; 318/121, 135; 104/148 LM

[56] References Cited
UNITED STATES PATENTS

| | | | |
|---|---|---|---|
| 3,648,084 | 3/1972 | Laithwaite et al. | 310/13 |
| 3,610,972 | 10/1971 | Pelenc | 310/13 |
| 2,731,212 | 1/1956 | Baker | 310/12 UX |
| 2,993,130 | 7/1961 | Laithwaite | 310/13 |
| 3,426,887 | 2/1969 | Ward et al. | 310/12 UX |

*Primary Examiner*—D. F. Duggan
*Attorney*—Holman & Stern

[57] ABSTRACT

A linear electric induction motor has at least one stator or primary winding having a transverse winding axis and a predetermined pole pitch and a cooperating rotor or secondary member having a cross-section which is unsymmetrical about the transverse axis of the stator. The rotor or secondary member is provided with a plurality of apertures in the form of slots aligned in the direction of traction of the rotor, so as to obviate expulsive forces arising on account of asymmetry of rotor cross-section and adversely influencing the rotor member thereby causing undesirable friction and loss of power. The length of each of the slots is advantageously made longer than the winding pole pitch and the interspace between the slots is expediently made less than the stator pole pitch.

5 Claims, 2 Drawing Figures

PATENTED NOV 13 1973 3,772,539

LINEAR INDUCTION ELECTRIC MOTOR

BACKGROUND OF THE INVENTION

1. Field of the Invention

The present invention relates to linear induction electric motors used for direct conversion of electric energy into mechanical energy of progressive translatory motion of the operating member in a machine or a mechanism.

2. Description of Prior Art

Known in the art is a linear induction motor comprising an elongated stator or primary inductor winding and a rotor or secondary member mounted asymmetrically with respect to a transverse axis of the stator said rotor being provided with slots that are made in its surface to reduce the expulsive forces appearing due to the asymmetrical position of the rotor.

When a rotor with a continuous and uniform cross section along the whole of its height (said height being measured perpendicular to the direction of traction) is arranged asymmetrically with respect to the stator, the current flowing along the rotor is distributed nonuniformly. As is known, this non-uniform current distribution produces expulsive forces acting perpendicular to the tractive force. These forces are sufficiently strong; frequently they increase friction and cause accelerated wear-out of the associated moving parts.

To reduce the above forces that tend to expulse the rotor, the latter is sometimes arranged symmetrically with respect to the stator transverse axis. In most cases this, however, leads to the weakening of parts that brace the stator mechanically and to excessive consumption of the non-ferrous metal used to manufacture the rotor.

SUMMARY OF THE INVENTION

The object of the present invention is to obviate the above disadvantages.

A specific object of the invention is to provide a linear induction electric motor of sufficient mechanical robustness and rigidity in which the above mentioned forces expulsing the rotor in a direction perpendicular to the action of the tractive force will be almost totally eliminated.

This object is achieved in a linear induction electric motor in which, according to the invention, the slots in the rotor are arranged along its length and the expulsive forces therefore are greatly reduced.

To eliminate the expulsive forces more effectively, it is advisable that the length of the slots running along the rotor should be increased, and the interspace between the slots should be less than the pole pitch of the stator.

In order to prevent nonuniformity of rotor current distribution, it is desirable to have the length of a slot substantially equal to and exceeding that of the pole pitch. Also, in order to limit the nonuniform current distribution, it is expedient to limit the interspace between slots to less than the pole pitch of the winding.

The present invention can find applications in devices and mechanisms where transverse forces produced by linear induction electric motors are undesirable since they can, for instance, result in undesirable resisting forces caused by friction. An example of such an application would be a towing carriage of a stand for ship model hydrodynamic tests. The linear motor in this case is mounted on top the carriage (it can not be attached to the carriage from below since it is impossible to place the rotor below the carriage where it would hamper the towing of the model).

BRIEF DESCRIPTION OF THE DRAWING

The invention will be better understood from a more detailed description of the linear induction electric motor of the present invention with reference to the accompanying drawings in which.

DESCRIPTION OF PREFERRED EMBODIMENT

Figure 2:
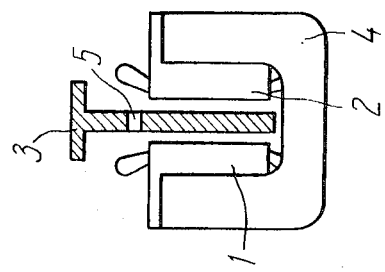
FIG. 2 is a front view of a linear induction electric motor.
Figure 1:
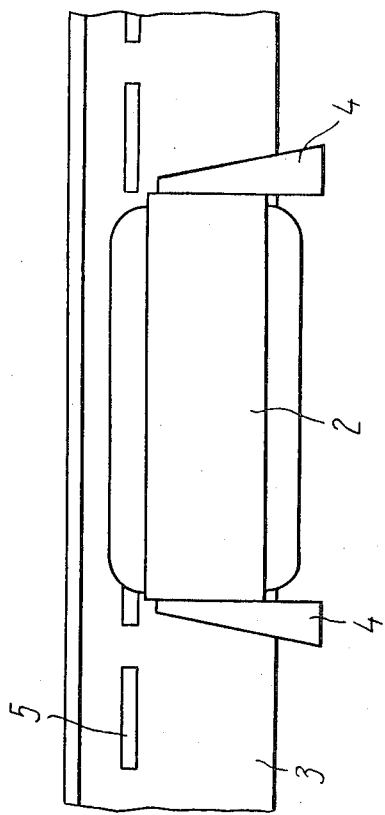
FIG. 1 presents a side view of a linear induction electric motor.

As is shown in FIGS. 1 and 2, the linear induction electric motor of the invention comprises an elongated stator including two sections respectively having windings 1 and 2 and a moving member 3 corresponding to the rotor and placed between them.

The upper and the lower parts of the cross-section of rotor 3 are asymmetric with respect to the plane of symmetry of the stator. The stator sections 1 and 2 are joined together with the aid of holders 4. They can alternatively be fixed on a suitable mount. To eliminate forces that tend to expulse the rotor 3 out of the interstator gap in a direction normal to the direction of traction the rotor 3 is provided with longitudinal slots 5 and the length of each slot should be either equal to, or greater than, the pole pitch $\tau$ of the stator (the width of the slots 5 produces no effect on the reduction of the expulsive forces), while the interspace between the said slots is expediently less than the pole pitch $\tau$ of the stator.

An alternating current flowing through the windings of the stator sections 1 and 2 produces a travelling magnetic field which spatially travels along the lengths stators 1 and 2 and along the length of the rotor 3. The travelling magnetic field induces an electro-motive force in the rotor 3 and creates electric currents which close within the pole pitch $\tau$. Since the length of the longitudinal slots 5 in the rotor 3 in accordance with the invention are either equal to or greater than the pole pitch $\tau$, these currents can not in fact get to the non-operating section of the rotor 3 beyond the slots 5. The magnetic field of the rotor 3, therefore, becomes symmetrical with respect to the magnetic field of the stators 1 and 2. Hence, no resultant expulsive force is produced since the distribution of longitudinal currents flowing through rotor areas on both sides of the symmetry axis of the stator sections is identical.

The arrangement of slots in the rotor described above will be just as effective in eliminating the rotor expulsive forces in case when the linear electric motor has only one stator section instead of two as illustrated in the exemplary embodiment.

What is claimed is:

1. A linear induction electric motor comprising: a primary winding constituting the stator, said primary winding having at least one winding section and a transverse axis and a predetermined pole pitch, a secondary member constituting a rotor and having a cross section asymmetrical with respect to said transverse axis of said at least one winding section, said rotor being provided with a plurality of aligned slots formed along a length thereof, thereby reducing the forces that expulse said rotor in a direction normal to the action of the tractive force on the rotor.

2. A linear induction electric motor as of claim 1, in which the length of said longitudinal slots in the rotor exceeds that of the pole pitch of the stator winding section, while the interspace between said slots is less than said pole pitch.

3. A linear induction electric motor as claimed in claim 1, in which said slots are provided asymmetrically with respect to said transverse axis of said at least one winding section.

4. A linear induction electric motor as claimed in claim 1, which includes two winding sections constituting the primary winding and disposed one on either side of the rotor.

5. A linear induction electric motor as claimed in claim 4, further including means for holding and securing said two winding sections.

* * * * *